Nov. 19, 1929.         C. A. STEELE              1,736,380
                  COTTON PLANTER ATTACHMENT
                   Filed Feb. 17, 1928      3 Sheets-Sheet 3
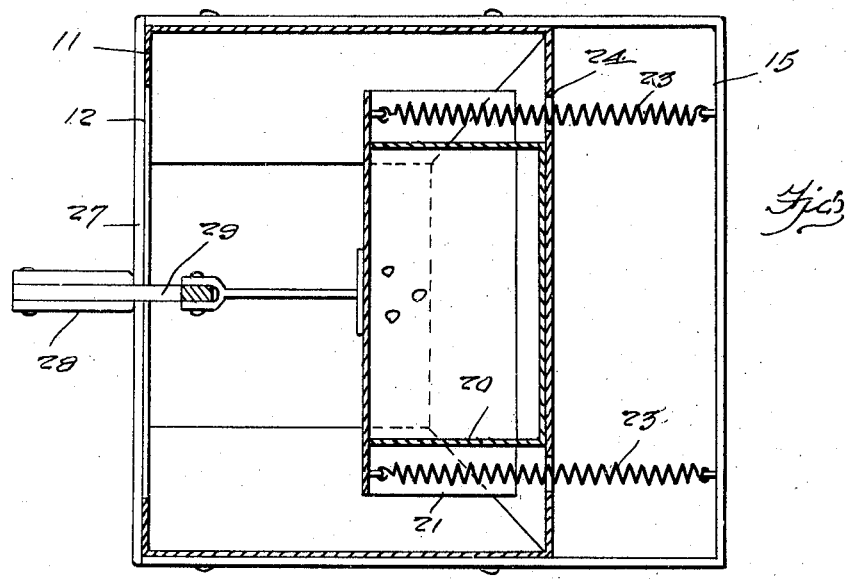
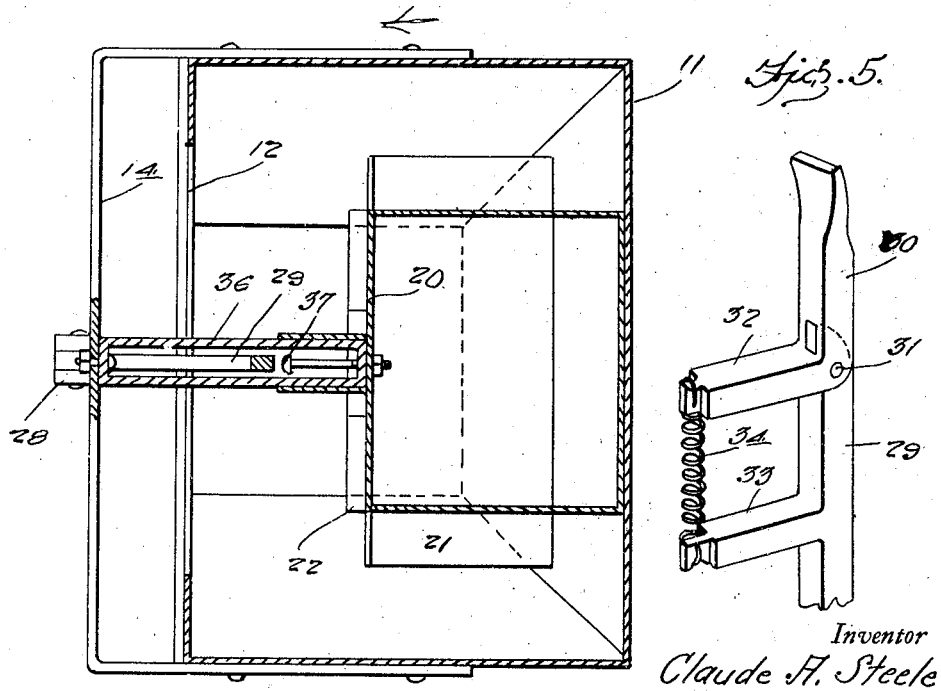
Inventor
Claude A. Steele
By Clarence A. O'Brien
                            Attorney Patented Nov. 19, 1929

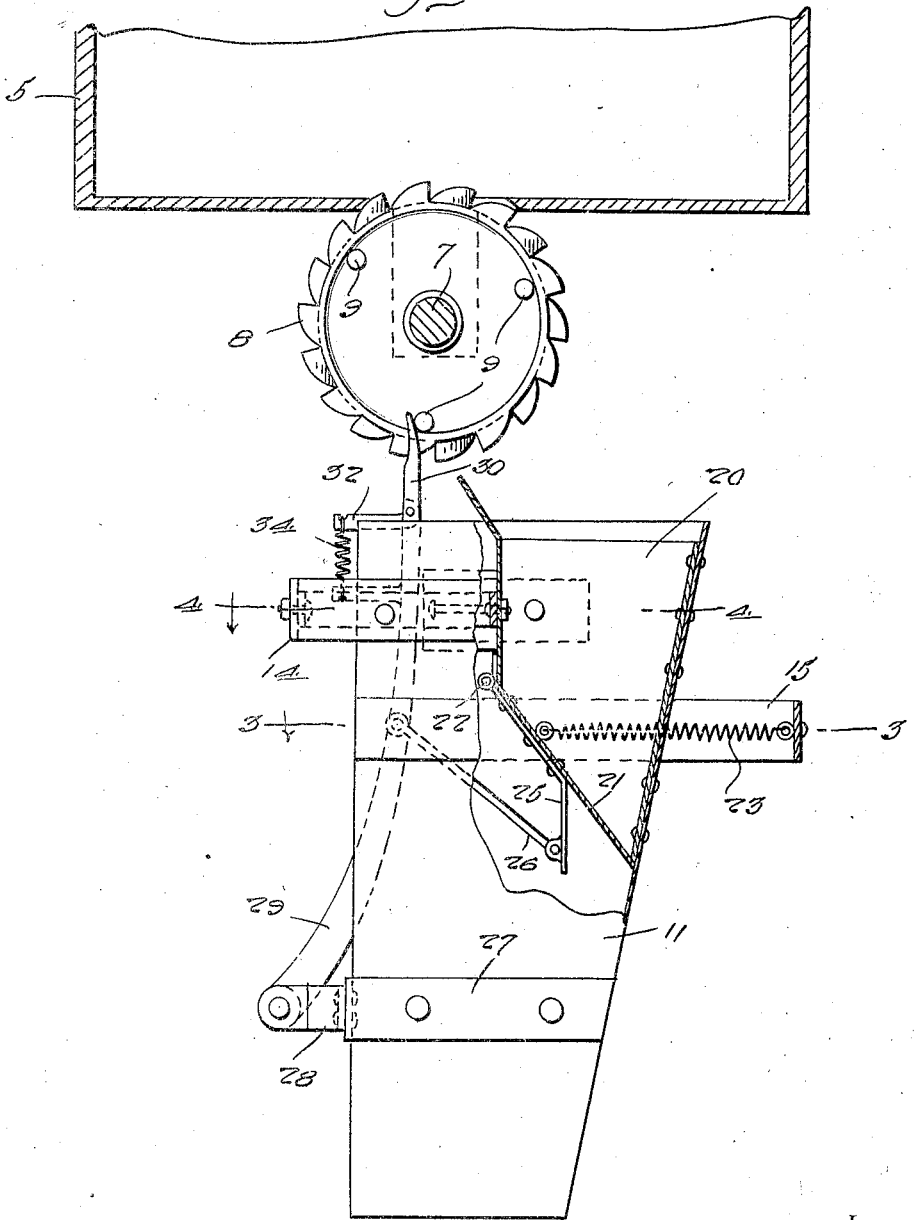

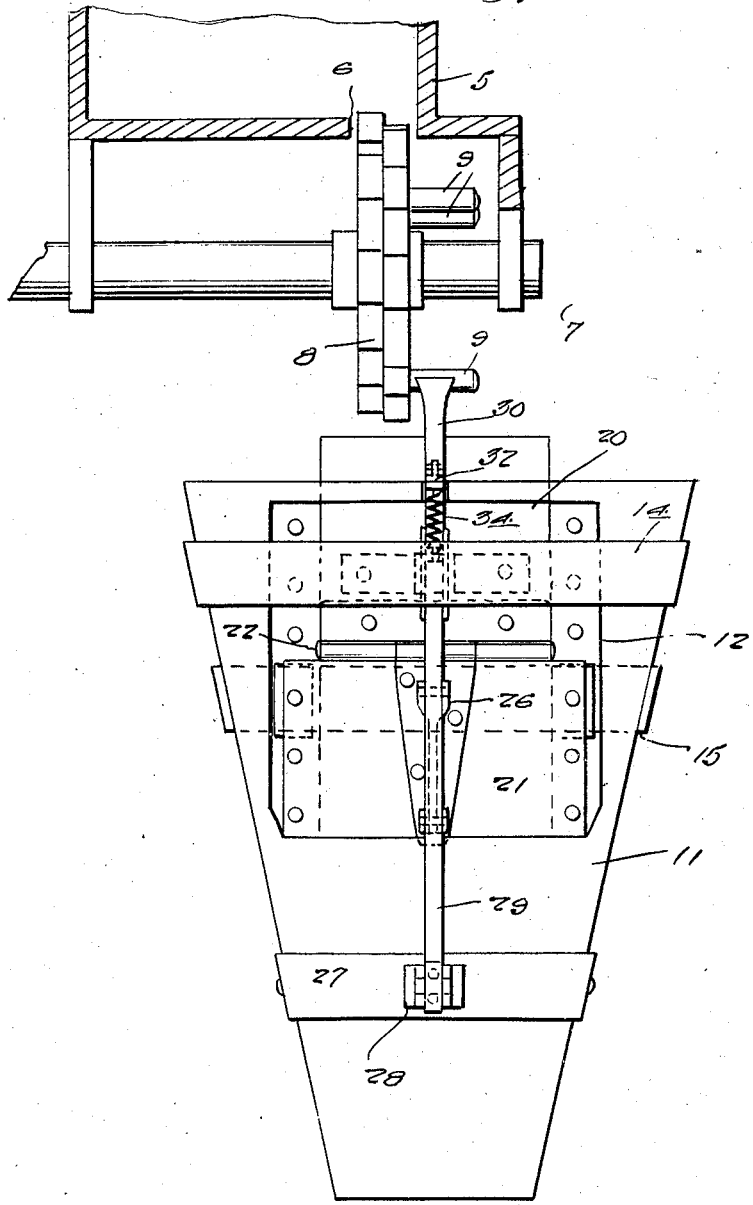

1,736,380

UNITED STATES PATENT OFFICE

CLAUDE A. STEELE, OF CHEYENNE, WYOMING

COTTON-PLANTER ATTACHMENT

Application filed February 17, 1928. Serial No. 254,983.

The present invention appertains to an attachment for use upon cotton planters and has for its prime object to provide a structure for dropping cotton seed in hills.

Another very important object of the invention resides in the provision of an attachment of this nature which will afford a considerable saving in cotton seed. It is now the common practice to use from two to three times as many seeds as is really necessary for the purpose of obtaining a stand of cotton and very frequently the common method fails because the seeds are too scattered.

By the present attachment in depositing the seeds in hills I not only save seed but also insure the stand as the seeds in the hills insure the bursting through thereof even though the ground is packed rather hard.

Another very important object of the invention resides in the provision of an attachment of this nature which eliminates to a considerable extent the necessity of thinning or chopping the cotton.

A still further very important object of the invention resides in the provision of an attachment of this nature which is comparatively simple in its construction, compact and convenient in its arrangement of parts, strong and durable, inexpensive to manufacture and install, thoroughly efficient and reliable in its operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:

Figure 1 is a side elevation with a portion of the planter in section and a portion of the attachment in section, Figure 2 is a front elevation thereof, Figure 3 is a horizontal transverse section taken substantially on the line 3—3 of Figure 1, Figure 4 is a horizontal section taken substantially on the line 4—4 of Figure 1, and Figure 5 is a perspective view of the upper end of a lever forming part of the present invention.

Referring to the drawing in detail it will be seen that numeral 5 denotes the seed box of a planter having the usual opening 6 in the bottom thereof that usually leads to the boot. In using my attachment the planting boot is removed and the attachment used in place thereof. The numeral 7 denotes the usual shaft having the notched wheel 8 mounted thereon so that a portion of its periphery extends through the opening 6 for taking from the seed box a certain amount of seed in each notch as will be readily appreciated by those skilled in this art. Thus far the parts are of conventional or any preferred construction. I place a plurality of pins 9 on the wheel 8 to project from one side thereof laterally. Any number of these pins may be used for the purpose of actuating my attachment about to be described.

The numeral 11 denotes a bootlike casing which is open at the top and bottom and tapers from the upper end downwardly. The front side wall of the boot like casing 11 is formed with an opening 12. A pair of U-shaped strap iron brackets 14 and 15 are attached to the casing 11, the former above the latter in spaced relation thereto. The bight portion of the bracket 14 is located a distance forwardly of the front wall of the casing 11 while the bight portion of the bracket 15 is located a distance rearwardly of the rear wall of the casing as will be quite apparent from a consideration of Figures 1, 3 and 4. Both brackets 14 and 15 are located within the confines of the top and bottom edges of the opening 12. The hopper is fastened to the frame of a planter in any preferred manner, such fastening means not being of the essence of invention.

Within the upper portion of the boot like casing 11 on the rear wall thereof there is fixed a hopper 20 the front and side walls of which are spaced from the respective walls of the boot like casing 11 as is quite apparent from an inspection of Figures 3 and 4. The bottom of the hopper 20 is open and has a closure 21 associated therewith being hingedly mounted as at 22. This closure 21 is wider than the hopper as is apparent from an inspection of Figure 3 and springs 23 are attached to the side portions thereof and extend exteriorly alongside of the hopper 20 through openings 24 in the rear wall of the casing 11 and are engaged on the bight portion of the strap iron bracket 15 so that these springs normally maintain the closure in its closed position. An arm 25 extends downwardly from the closure 21 and has pivotally engaged therewith a link 26. A strap 27 is disposed about the lower portion of the boot like casing 11 and has mounted thereon a bracket 28 projecting forwardly from the front wall of the casing. A lever 29 is pivoted at its lower end on the bracket 28 and is curved so as to project through the opening 12. At the upper end of the lever 29 there is mounted an engaging member 30 which has a hinged connection 31 clearly illustrated in Figure 5 which allows the same to break in one direction and prevent breaking in the other direction. This member 30 is terminated in the path of movement of the pins 9 so that, referring to Figure 1, when the wheel 8 travels in a clockwise direction the member 30 will not break in respect to the lever 29 and therefore will rock this lever 29 but if the wheel 8 rotates in a counter clockwise direction the member 30 will break in respect to the member 29 so as not to rock the lever. A projection 32 is provided on the member 30 and a projection 33 is provided on the lever 29. A spring 34 is engaged with the extremities of the projections 32 and 33 normally holding the member 30 in substantial alinement with the lever. The link 26 is pivotally engaged with an intermediate portion of the lever 29 so that when the lever, still referring to Figure 1, is rocked by the clockwise rotation of the wheel 8 through the pins 9 and the member 30 the closure 21 will be opened and as the pins clear the member 30 the springs 23 will return the closure to a closed position and also return the lever in a position so that the member 30 will be engaged by the next pin. A guide member 36 of rectangular formation is mounted between the center of the bight portion of the bracket 14 and the front wall of the hopper 20 and the lever 29 extends therethrough. A buffer in the form of a bolt 37 engages the guide member with the front wall of the hopper 20 and projects inwardly of the guide member to limit the rearward movement of the lever 29.

From the above detailed description it is thought that the construction, operation, and advantages of the invention will be quite apparent. As the planter moves along and the shaft is rotated, thereby rotating the wheel 8 in the usual well known manner, seeds from the seed box 5 are delivered by the notches of the wheel 8 into the hopper 20 and the hopper will be emptied only when one of the pins 9 actuates the lever 29 in the manner specified. In this way the seeds are bunched so as to be deposited in hills at certain intervals depending upon the number of the pins 9. Although I have shown three pins in the present instance it is to be understood that one or more pins may be used depending upon the size of the hills desired and frequency of deposit desired. Should the planter move rearwardly in its maneuvers as frequently becomes necessary my attachment will not operate because of the provision of the member 30 limited to swing in an arc of approximately ninety degrees by the rule joint 31.

The present embodiment of the invention has been disclosed in detail merely by way of example since in actual practice it attains the features of advantage enumerated as desirable in the statement of the invention and the above description. It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. An attachment of the class described comprising, a boot-like casing for disposition below the seed box of a planter, a hopper in the boot-like casing, a hinged closure at the bottom end of the hopper, an arm projecting from the closure, a link pivotally engaged with the arm, a lever pivoted on the boot and extending therethrough upwardly thereof, said link being pivotally engaged with an intermediate portion of the lever, a notched wheel rotatably mounted intermediate the feed box and said boot-like casing having pins projecting laterally therefrom for engaging the lever to rock the same and swing the closure to an open position.

2. An attachment of the class described comprising, a boot-like casing for disposition below the seed box of a planter, a hopper in the boot-like casing, a hinged closure at the bottom end of the hopper, an arm projecting from the closure, a link pivotally engaged with the arm, a lever pivoted on the boot-like casing and extending therethrough upwardly thereof, said link being pivotally engaged with an intermediate portion of the lever, a notched wheel rotatably mounted intermediate the feed box and said boot-like casing, and having pins projecting laterally therefrom for engaging the lever to rock the same and swing the closure to an open position, spring means for returning the closure to a closed position, 3. In combination, a feed box having an opening in the bottom thereof, a notched wheel rotatably mounted below the feed box with a portion of its periphery in the opening, pins projecting laterally from the wheel, a boot-like casing below the opening, a hopper in the boot-like casing, a hinged closure for the bottom of the hopper, and means actuatable by the pins for opening the closure, said closure being wider than the hopper to project beyond the sides thereof, springs engaged with the side portions of the closure and projecting through openings in the boot-like casing, and a bracket on the boot-like casing having a portion remote therefrom with which said springs are engaged for returning the closure to a closed position.

4. In combination, a seed box having an opening in the bottom thereof, a notched wheel rotatably mounted below the feed box with a portion of its periphery in the opening, pins projecting laterally from the wheel, a boot-like casing below the opening, the rear wall of the casing being provided with an opening, a bracket on the rear wall of the casing adjacent the lower end thereof, a lever pivotally engaged with the bracket and projecting into the opening, a member, a rule joint between the member and the upper end of the lever, said member being terminated in the path of movement of the pins, spring means for holding the member in an engageable position with the pins, a hopper in the casing, a hinged closure for the bottom end of the hopper, means connecting the closure with the lever, and spring means for returning the closure to a closed position when opened by said lever.

5. In combination, a seed box having an opening in the bottom thereof, a notched wheel rotatably mounted below the feed box with a portion of its periphery in the opening, pins projecting laterally from the wheel, a boot-like casing below the opening, the rear wall of the casing being provided with an opening, a bracket on the rear wall of the casing adjacent the lower end thereof, a lever pivotally engaged with the bracket and projecting into the opening, a member, a rule joint between the member and the upper end of the lever, said member being terminated in the path of movement of the pins, spring means for holding the member in an engageable position with the pins, a hopper in the casing, a hinged closure for the bottom end of the hopper, means connecting the closure with the lever, and spring means for returning the closure to a closed position when opened by said lever, said spring means comprising a pair of springs engaged with the side portions of the closure and projecting through openings in the boot-like casing one to each side of the hopper, and a bracket having a portion remote exteriorly from the boot with which said springs are engaged.

6. In combination, a seed box having an opening in the bottom thereof, a notched wheel rotatably mounted below the feed box with a portion of its periphery in the opening, pins projecting laterally from the wheel, a boot-like casing below the opening, the rear wall of the casing being provided with an opening, a bracket on the rear wall of the casing adjacent the lower end thereof, a lever pivotally engaged with the bracket and projecting into the opening, a member, a rule joint between the member and the upper end of the lever, said member being terminated in the path of movement of the pins, spring means for holding the member in an engageable position with the pins, a hopper in the casing, a hinged closure for the bottom end of the hopper, means connecting the closure with the lever, and spring means for returning the closure to a closed position when opened by said lever, said spring means comprising a pair of springs engaged with the side portions of the closure and projecting through openings in the boot-like casing one to each side of the hopper, and a bracket having a portion remote exteriorly from the boot with which said springs are engaged, a U-shaped bracket having its legs attached to the casing with the bight portion remote therefrom opposite the opening in the boot and a guide between the remote portion of the bracket last mentioned and the adjacent wall of the hopper, said lever being projected through said guide.

7. In combination, a seed box having an opening in the bottom thereof, a notched wheel rotatably mounted below the feed box with a portion of its periphery in the opening, pins projecting laterally from the wheel, a boot-like casing below the opening, the rear wall of the casing being provided with an opening, a bracket on the rear wall of the casing adjacent the lower end thereof, a lever pivotally engaged with the bracket and projecting into the opening, a member, a rule joint between the member and the upper end of the lever, said member being terminated in the path of movement of the pins, spring means for holding the member in an engageable position with the pins, a hopper in the casing, a hinged closure for the bottom end of the hopper, means connecting the closure with the lever, and spring means for returning the closure to a closed position when opened by said lever, said spring means comprising a pair of springs engaged with the side portions of the closure and projecting through openings in the boot-like casing one to each side of the hopper, and a bracket having a portion remote exteriorly from the boot with which said springs are engaged, a U-shaped bracket having its legs attached to the casing with the bight portion remote therefrom opposite the opening in the boot and a guide between the remote portion of the bracket last mentioned and the adjacent wall of the hopper, said lever being projected through said guide, and a buffer projecting into the guide to limit movement of the lever toward the hopper.

In testimony whereof I affix my signature.

CLAUDE A. STEELE.